(12) United States Patent
Walker

(10) Patent No.: US 9,647,788 B2
(45) Date of Patent: May 9, 2017

(54) LOW LATENCY MULTIPLEXING FOR OPTICAL TRANSPORT NETWORKS

(71) Applicant: Timothy P. Walker, Boxford, MA (US)

(72) Inventor: Timothy P. Walker, Boxford, MA (US)

(73) Assignee: APPLIED MICRO CIRCUITS CORPORATION, Santa Clara, CA (US)

( * ) Notice: Subject to any disclaimer, the term of this patent is extended or adjusted under 35 U.S.C. 154(b) by 270 days.

(21) Appl. No.: 13/764,888

(22) Filed: Feb. 12, 2013

(65) Prior Publication Data

US 2014/0226980 A1    Aug. 14, 2014

(51) Int. Cl.
| | |
|---|---|
| *G01R 31/08* | (2006.01) |
| *H04L 5/14* | (2006.01) |
| *H04B 7/00* | (2006.01) |
| *H04J 14/00* | (2006.01) |

(52) U.S. Cl.
CPC ................................. *H04J 14/00* (2013.01)

(58) Field of Classification Search
CPC ...... H04J 14/00; H04J 4/0212; H04J 14/0213; H04J 14/0227; H04J 14/0228; H04L 1/0003; H04L 1/0009
USPC ............................ 370/465; 398/28, 140, 141
See application file for complete search history.

(56) References Cited

U.S. PATENT DOCUMENTS

| | | | |
|---|---|---|---|
| 7,415,207 B2 | 8/2008 | Lanzone et al. | |
| 7,583,697 B2 | 9/2009 | Zou | |
| 7,742,502 B2 | 6/2010 | Vissers et al. | |
| 7,944,928 B2 | 5/2011 | Zou | |
| 8,135,285 B2 | 3/2012 | Kisaka et al. | |
| 8,160,445 B2 | 4/2012 | Lanzone et al. | |
| 2003/0120799 A1* | 6/2003 | Lahav | H04J 3/1611 709/236 |
| 2007/0248121 A1* | 10/2007 | Zou | H04J 3/1611 370/498 |
| 2009/0169217 A1* | 7/2009 | Meagher | H04J 3/047 398/140 |

(Continued)

*Primary Examiner* — Faruk Hamza
*Assistant Examiner* — Abu-Sayeed Haque
(74) *Attorney, Agent, or Firm* — Amin, Turocy & Watson LLP

(57) ABSTRACT

Techniques for multiplexing and demultiplexing signals for optical transport networks are presented. A network component comprises a multiplexer component that multiplexes a plurality of signals having a first signal format to produce a multiplexed signal in accordance with a second signal format, while maintaining error correction code (ECC) of such signals and without decoding such signals and associated ECC. The multiplexer component interleaves the plurality of signals with stuffing and adds overhead without generating new ECC. A second network component receives the multiplexed signal as part of a frame in accordance with the second signal format. A demultiplexer component of the second network component demultiplexes the multiplexed signal using the original ECC associated with the plurality of signals, wherein the second network element removes and filters the stuffing from the multiplexed signal and produces a plurality of demultiplexed signals as an output, in accordance with the first signal format.

20 Claims, 9 Drawing Sheets

(56) References Cited

U.S. PATENT DOCUMENTS

| | | | |
|---|---|---|---|
| 2010/0142947 A1* | 6/2010 | Shin | H04J 3/1652 398/43 |
| 2010/0177785 A1* | 7/2010 | Kisaka | H04L 25/14 370/465 |
| 2010/0229074 A1* | 9/2010 | Shin | H04J 3/1658 714/782 |
| 2011/0236031 A1* | 9/2011 | Itou | 398/141 |
| 2013/0209091 A1* | 8/2013 | Mateosky | H04B 10/07953 398/26 |

* cited by examiner

LOW LATENCY MULTIPLEXING FOR OPTICAL TRANSPORT NETWORKS

TECHNICAL FIELD

The subject disclosure relates generally to data processing, and more particularly to multiplexing of signals for optical transport networks.

BACKGROUND

When communicating signals across a network, such as an optical transport network (OTN), the signals can be processed in a variety of ways to facilitate communicating such signals across the network. For instance, signals can be multiplexed and/or encoded to facilitate transmission of signals across a network, wherein error correction can be generated and associated with signals to facilitate recovering the signals through demultiplexing and/or decoding at a destination.

With regard to OTNs, there can be a variety of formats that can be employed. Such formats can include, for example, an optical transport unit (OTU) 2 (OTU2) format, OTU2e format, and OTU4 format, among other formats, in accordance with various protocols (e.g., ITU-T/G.709 protocol). Conventionally, a standard procedure for multiplexing signals to OTU4 is to decode the signals and error correction code (ECC) (e.g., forward error correction (FEC)), generate new ECC (e.g., new FEC), multiplex the signals (e.g., optical data units (ODUs)), and add on or associate the new ECC with the signals during the multiplexing process. The decoding and encoding of the signals and ECC can inefficiently and/or unnecessarily add latency to the transmission of the signals and/or can inefficiently or unnecessarily consume gates.

The above-described description is merely intended to provide a contextual overview of current techniques for multiplexing and demultiplexing of signals and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a memory that stores instructions associated with components; and a processor that executes the instructions stored in the memory to facilitate performance of operations by the components. The components comprise a network component that receives a plurality of signals associated with a first signal format and facilitates communication of information associated with the plurality of signals in a communication network. The components further comprise a multiplexer component that multiplexes the plurality of signals and error correction code associated with the plurality of signals to generate multiplexed signals in accordance with a second signal format, while maintaining and without decoding the error correction code prior to or during the multiplexing of the plurality of signals.

In another example embodiment, a method comprises multiplexing, by a system comprising a processor, a plurality of signals, including error correction code associated with the plurality of signals, associated with a first signal format to generate multiplexed signals based at least in part on a second signal format, while maintaining and without decoding the error correction code. The method also includes providing, by the system, the multiplexed signals associated with the second signal format as an output.

In an example embodiment, a system comprises a memory that stores instructions associated with components; and a processor that executes the instructions stored in the memory to facilitate performance of operations by the components. The components comprise a network component that receives multiplexed signals and facilitates communication of information associated with the multiplexed signals in a communication network. The components also comprise a demultiplexer component that demultiplexes the multiplexed signals to generate a plurality of demultiplexed signals and associated error correction code in accordance with a first signal format, wherein the multiplexed signals are associated with a frame that corresponds to a second signal format, and wherein, during generation of the multiplexed signals, a plurality of signals and the error correction code, which are associated with the first signal format, are multiplexed to generate the multiplexed signals while maintaining and without decoding the error correction code prior to or during the multiplexing of the plurality of signals.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
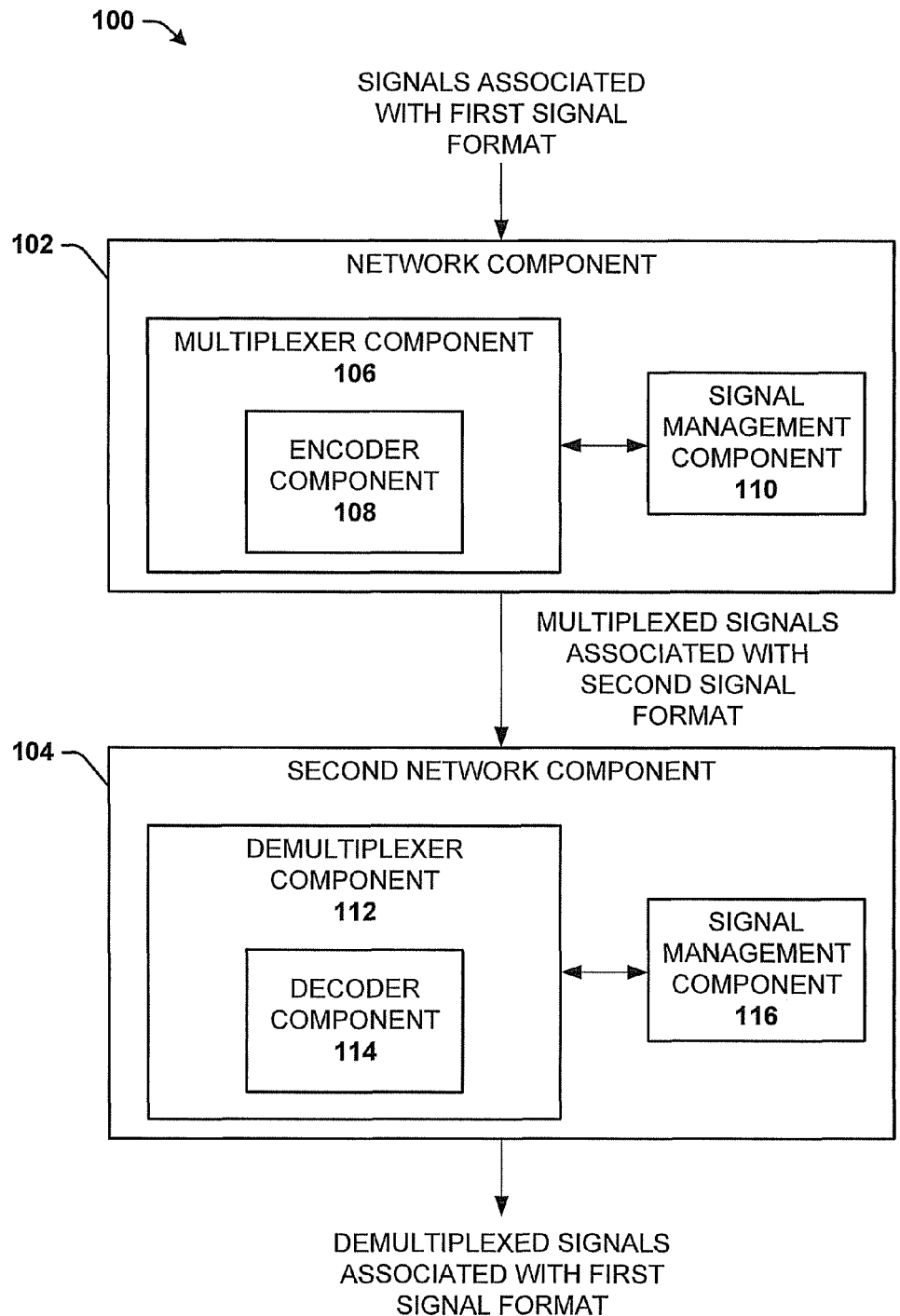
FIG. 1 illustrates a block diagram of an example system that can facilitate efficiently multiplexing and demultiplexing signals across multiple formats (e.g., multiple transport formats) for a communication network, in accordance with various aspects of the disclosed subject matter.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

When communicating signals across a communication network, such as an optical transport network (OTN), the signals can be processed in a variety of ways to facilitate communicating such signals across the network. For instance, signals can be multiplexed and/or encoded to facilitate transmission of signals across a network, wherein error correction can be generated and associated with signals to facilitate recovering the signals through demultiplexing and/or decoding at a destination. At a destination (e.g., destination node), signals can be demultiplexed and/or decoded to facilitate obtaining or recovering the signals, wherein the ECC associated with the signals can be employed to facilitate recovering the signals through demultiplexing and/or decoding at the destination.

With regard to OTNs, there can be a variety of formats that can be employed. Such formats can include, for example, an optical transport unit (OTU) 2 (OTU2) format, OTU2e format, OTU3 format, OTU3 e2 format, OTU4 format, or OTU5 format, among other OTU-type formats, in accordance with various protocols (e.g., ITU-T/G.709 protocol). Conventionally, a standard procedure for multiplexing signals (e.g., OTU2 or OTU2e signals, which can have a communication rate of 10 Gigabit(G)/second) to OTU4 (which can have signals communicated at a rate of 100 G/second) is to decode the signals and error correction code (ECC) (e.g., forward error correction (FEC)), generate new ECC (e.g., new FEC), multiplex the signals (e.g., optical data units (ODUs)) to the next level (e.g., the OTU4 level), and add on or associate the new ECC with the multiplexed signal during the multiplexing process. The decoding and encoding of the signals and ECC during the multiplexing process can inefficiently and/or unnecessarily add latency to the transmission of the signals (e.g., OTN signals) and/or can inefficiently or unnecessarily consume gates (e.g., unnecessarily use millions of gates/10G channel). For example, with regard to generic forward error correction (GFEC) (e.g., generic Reed-Solomon FEC), the decoding and encoding of the GFEC associated with signals can add latency of approximately 7.4 microseconds. As another example, with regard to enhanced forward error correction (EFEC), the decoding and encoding of the EFEC associated with signals can add latency of approximately 49.6 microseconds.

To that end, techniques for efficiently multiplexing and demultiplexing signals across multiple formats (e.g., multiple transport formats) for OTNs are presented. A network component (e.g., network element (e.g., optical network element (ONE), network node, network device, etc.) can receive a plurality of signals (e.g., ODUs) in accordance with a first format (e.g., OTU2, OTU2e). The plurality of signals can be associated with ECC (e.g., FEC) that can be used to facilitate decoding and/or demultiplexing the data associated with the plurality of signals at a desired destination (e.g., a second network component).

The network component can include a multiplexer component that can multiplex the plurality of signals, wherein the multiplexer component can include, for example, an encoder component that can facilitate encoding or multiplexing the plurality of signals. The multiplexer component can multiplex and/or encode the plurality of signals that can be in the first signal format to produce a multiplexed signal in accordance with a second signal format (OTU4 or OTU5 format), while maintaining and multiplexing the original ECC associated with the plurality of signals (e.g., ECC associated with the first format (e.g., ECC associated with an OTU2 or OTU2e format)) and without decoding the plurality of signals and associated ECC. The multiplexer component can process or treat the plurality of signals as constant bit rate (CBR) signals. The multiplexer component also can multiplex and/or encode the plurality of signals, including the original ECC, to generate a multiplexed signal based on a frame (e.g., frame for an OTU4 or OTU5 signal) in accordance with the second format (e.g., OTU4 or OTU5 format). The multiplexer component further can interleave the plurality of signals with stuffing and can add overhead (e.g., OTU4 or OTU5 overhead) to the multiplexed signal, without generating and adding new ECC for the multiplexed signal. The network component can provide the multiplexed signal, with the stuffing, overhead, and original ECC as an output for transmission to another component, which can be a second network component or another network component that can facilitate transmitting the multiplexed signal, with the stuffing, overhead, and original ECC to the second network component.

The second network component can receive the multiplexed signal as part of a frame (e.g., frame on an OTU4 or OTU5 signal) in accordance with the second signal format (e.g., OTU4 or OTU5 format). The second network component can comprise a demultiplexer component that can demultiplex the multiplexed signal using the original ECC associated with the plurality of signals. The second network component can identify or determine where the signals (e.g., treated as CBR signals) of the multiplexed signal are located within the frame based at least in part on the framing of the multiplexed signal (e.g., based at least in part on knowing the structure of the frame associated with the OTU4 or OTU5 format). As part of the demultiplexing and/or decoding process, the second network component can deinterleave the multiplexed signal, and can remove and/or filter the stuffing from the multiplexed signal. Based at least in part on the demultiplexing and/or decoding process, the second network component can generate or produce a plurality of demultiplexed signals as an output, in accordance with the first signal format (e.g., OTU2 or OTU2e format).

The above aspects and other aspects of the disclosed subject matter are described with regard to the figures.

Turning now to FIG. 1, illustrated is a block diagram of an example system 100 that can facilitate efficiently multiplexing and demultiplexing signals across multiple formats (e.g., multiple signal transport formats) for a communication network (e.g., an OTN), in accordance with various aspects of the disclosed subject matter. System 100 can include a network component 102 that can receive a plurality of signals (e.g., ODUs) in accordance with a first format (e.g., an OTUx format, wherein x can be virtually any desired alphanumeric value, such as, for example, 2 or 2e to represent an OTU2 or OTU2e format). The plurality of signals (e.g., 10 signals) can be associated with ECC (e.g., FEC-type ECC, such as FEC, EFEC, GFEC, etc.) that can be used to facilitate decoding and/or demultiplexing the data associated with the plurality of signals at a desired destination (e.g., a second network component, such as network component 104). Signals can be communicated throughout the network via frames or packets (e.g., a sequence of frames or packets), wherein each frame or packet can include a data payload, ECC, overhead information, and/or other information.

The network component 102 can include a multiplexer component 106 that can multiplex the plurality of signals, wherein the multiplexer component 106 can include, for example, an encoder component 108 that can facilitate encoding or multiplexing the plurality of signals. The network component 102 also can include a signal management component 110 that can be associated with (e.g., communicatively connected to) the multiplexer component 106 and control operations associated with the network component 102, including operations associated with the multiplexer component 106, to facilitate processing signals received by or transmitted from the network component 102. For example, the signal management component 110 can control operations of the multiplexer component 106 to facilitate multiplexing and/or encoding the plurality of signals, which can be in the first signal format (e.g., an OTUx format), to produce a multiplexed signal in accordance with a second signal format (e.g., OTUy format, wherein y can be virtually any desired alphanumeric value, such as, for example, 4 to represent an OTU4 format or 5 to represent an OTU5 format), while maintaining and multiplexing the original ECC associated with the plurality of signals (e.g., ECC associated with the first format (e.g., ECC associated with the OTUx format)) and without decoding the plurality of signals and associated ECC.

Based at least in part on the control instructions from the signal management component 110, the multiplexer component 106 can multiplex and/or encode the plurality of signals, which can be in the first signal format (e.g., an OTUx format) when received by the network component 102, to produce a multiplexed signal in accordance with the second signal format (e.g., OTUy format), while maintaining the original ECC associated with the plurality of signals (e.g., ECC associated with the first format (e.g., ECC associated with the OTUx format)) and without decoding the plurality of signals and associated ECC (e.g., without decoding the FEC-type ECC and terminating the ECC bytes associated with the OTUx signals before multiplexing, and generating new ECC (e.g., OTUy ECC) for the multiplexed signals).

In some implementations, the signal management component 110 and the multiplexer component 106 can process or treat the plurality of signals in a same or similar manner as CBR signals (e.g., can process or treat the plurality of signals without regard to the content of the signals). The multiplexer component 106 also can multiplex and/or encode the plurality of signals to generate multiplexed signals based at least in part on a frame (e.g., a frame for an OTUy signal) in accordance with the second format (e.g., OTUy format).

Figure 2:
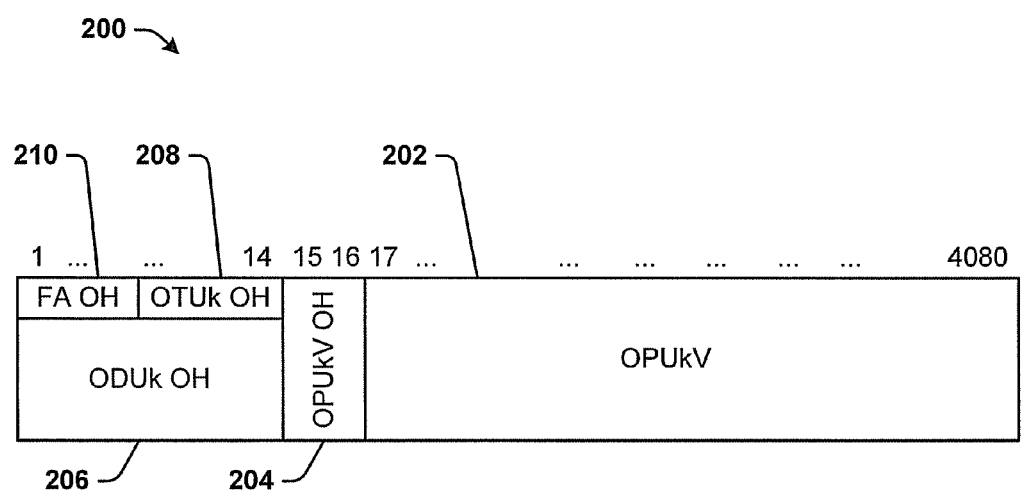
FIG. 2 depicts a diagram of an example optical transport unit (OTU), in accordance with various aspects and embodiments of the disclosed subject matter.

Referring briefly to FIG. 2 (along with FIG. 1), FIG. 2 depicts a diagram of an example OTU 200 (e.g., an OTUk frame or OTUkV frame), in accordance with various aspects and embodiments of the disclosed subject matter. The OTU 200 can be identified as OTUk or OTUkV, wherein OTUk or OTUkV can represent, for example, OTU4 (and/or a higher rate OTU (e.g., OTU5)). As more fully disclosed herein, when the OTU 200 is employed for OTU4, the OTU 200 can contain sufficient capacity to transport a plurality (e.g., 10) of OTU2 and/or OTU2e signals. The OTU 200 can include a plurality of rows (e.g., n rows, wherein n can be an integer number) and a plurality of columns (e.g., m rows, wherein m can be an integer number). For example, when the OTU 200 represents an OTU4 format, the OTU 200 can comprise 4 rows and 4080 columns.

The OTU 200 can include an optical payload unit (OPU) kV container or region 202 (OPUkV) that can hold (e.g., store) or transport the data payload of the OTU 200. The OPUkV container or region 202 can span, for example, from column 17 to column 4080, inclusive. The OPUkV container or region 202 also can contain ECC (e.g., the original FEC associated with the OTU2 and/or OTU2e signals) associated with the payload. A completely standardized data payload container (e.g., OPUk container or region) can span from column 17 to column 3824 for use in storing and transporting a data payload, inclusive, wherein columns 3825 to column 4080, inclusive, can be used to store the OTUk FEC (e.g., OTU4 FEC). With regard to the OPUkV container or region 202, since, in accordance with the disclosed subject matter, it is not necessary to decode the OTU2 or OTU2e ECC and generate new OTU4 FEC for the multiplexed signals, it is not necessary for the OTU 200 to include or reserve a separate OTUk FEC region for OTUk FEC, and those 256 columns (e.g., columns 3825 through 4080) can be part of the OPUkV container or region 202 (e.g., spanning columns 17 through 4080). The "V" in, for example, OPUkV can denote that the region (e.g., the OPUkV container or region) can have a structure that can be functionally standardized with regard to a defined protocol (e.g., the ITU-T/G.709 protocol), whereas OPUk can denote that a region (e.g., the OPUk container or region) can have a structure that can be completely standardized with regard to the defined protocol.

The OTU 200 also can comprise an OPUkV overhead (OH) container or region 204 (OPUkV OH) that can store or transport overhead information relating to the OPUkV of the OTU 200. The OPUkV OH container or region 204 can be in columns 15 and 16 of the OTU 200, for example. The OTU 200 further can include an ODUk OH container or region 206 (ODUk OH) that can hold or transport overhead information relating to the ODUk of the OTU 200. The OTU 200 can comprise an OTUk OH container or region 208 (OTUk OH) that can hold or transport overhead information relating to the OTU 200. The OTU 200 also can include a frame alignment (FA) OH container or region 210 (FA OH) that can hold or transport overhead information relating to the frame alignment for the OTU 200. The frame alignment overhead information in FA OH region 210 can indicate a fixed pattern in each OTN signal. The framing (e.g., OTU4 framing) can mean that the network component 102 can look for this fixed pattern repeated every 16,320 bytes (e.g., 4 rows*4080 columns=16,320 bytes). Once the network component 102 (e.g., signal management component 110 of the network component 102) has identified the repeatable fixed pattern, based at least in part on the frame alignment overhead information in FA OH region 210, the network component 102 can identify and know the structure of the signal.

The OPU4 container (e.g., OPUkV container 202) can be divided into 10 timeslots, wherein there can be one timeslot for each 10G container. With regard to such an OPU4 container, the OTU4 rate=255/227*10*OC192; the OPU4 container=254/255*OTU4=254/227*OC192*10; and each 10G container=254/227*OC192 data rate. It can be proven that the OTU2 and OTU2e signals can fit in the 10G container. With regard to OTU2 signals, OTU2=255/237*OC192; and thus, the 10G container=254/227*237/255*255/237*OC192; and thus, the 10G container=254/227*237/255*OTU2=1.0399585*OTU2. With regard to OTU2e signals, OTU2e=255/237*10GE/OC192*OC192; and thus, the 10G container=254/227*237/255*OC192/10GE*255/237*10GE/OC192*OC192; and thus, the 10G container=254/227*237/255*OC192/10GE*OTU2e=1.003733*OTU2e. Thus, there is sufficient capacity for the OTU 200 to transport a plurality of OTU2 and/or OTU2e signals.

The signal management component 110 and multiplexer component 106 can employ a number of different techniques and processes to facilitate performing rate adaptation as part of the multiplexing process. In some implementations, the signal management component 110 and multiplexer component 106 can utilize generic mapping procedure (GMP) mapping to map each client (e.g., client signal) into the container (e.g., OTUy container). In other implementations, the signal management component 110 and multiplexer component 106 can utilize asynchronous mapping procedure (AMP) mapping with fixed time slots per frame (e.g., OTUy frame).

As an illustration of AMP mapping with regard to OTU4, there can be an OPU4 container (e.g., OPUkV 202) that can be 4080−16=4064 columns wide. The network component 102 can structure the OTU4 frame to add 14 fixed columns to the OTU4 frame, which can make 4050 columns available for the payload. Thus, there can be 405 columns/frame/10G container. This can be similar in format to that of the 1.25G timeslot assignment associated with the ITU-T/G.709 protocol except that the format of the OTU4 frame can use 14 fixed stuff columns as opposed to 8 columns.

With regard to the OTU2 case, OTU4=255/227*10*OC192. The OTU4 container=(4080−30)/4080*OTU4=405/408*255/227*10*OC192. Thus, each 10G container=405/408*255/227*OC192 data rate. Also, OTU2=255/237*OC192; and thus, the 10G container=405/408*255/227*237/255*255/237*OC192; and thus, the 10G container=405/408*237/227*OTU2=1.00036376*OTU2. Therefore, the 10G container=1.036376*OTU2 (36376 (parts per million) ppm greater). If or when 142 columns of the 10G container are defined as fixed stuff columns, this can reduce the rate by (4050−142)/4050 to 1.000088*OTU2 (88 ppm greater). This can be within the range of double justification as outlined in the ITU-T/G.709 protocol.

With regard to the OTU2e case, as indicated, OTU4=255/227*10*OC192; the OTU4 container=(4080−30)/4080*OTU4=405/408*255/227*10*OC192; and thus, each 10G container=405/408*255/227*OC192 data rate. OTU2e=255/237*10GE/OC192*OC192; and thus, the 10G container=405/408*255/227*237/255*OC192/10GE*255/237*10GE/OC192*OC192; and thus, the 10G container = 405/408*255/227*237/255*OC192/10GE*OTU2e= 1.0002754*OTU2e. Therefore, the 10G container= 1.0002754*OTU2e (275 ppm greater). If or when 1 column of the 10G container is defined as a fixed stuff column, this can reduce the rate by (4050−1)14050 to 1.000028*OTU2 (28 ppm greater). This can be within the range of double justification as outlined in the ITU-T/G.709 protocol.

While the disclosed subject matter has described the OTU2 and OTU2e signals separately, as desired, the network component 102 can multiplex both OTU2 and OTU2e signals together to generate a multiplexed signal in accordance with a second signal format (e.g., OTUy format, such as OTU4 or OTU5 format) and frame (e.g., OTUy frame, such as OTU4 or OTU5 frame) because the network component 102 can have stuffing columns in the second signal format (OTUy) overhead.

The network component 102 can use a frame format for the frame (e.g., 100G frame) that can be the same or substantially the same as the format for the OTUy (e.g., OTU4 ) frame (e.g., can be the same or substantially the same as the format for the OTU4 frame, except that, for example, as disclosed herein, there can be an OPUkV container or region 202 rather than a completely standardized OPUk container and OTUk FEC region). In some implementations, since there is no new OTUy ECC generated by the network component 102 as part of the multiplexing process, the framing criteria (e.g., with regard to an amount of acceptable error in a signal) and/or the framing algorithm associated with (e.g., applied in relation to) the frame can be modified, as desired (e.g., as needed), to account for there being no OTUy ECC associated with the multiplexed signals of the frame.

The amount of stuffing that the network component 102 can use during the multiplexing process can vary based at least in part on the first signal format and the second signal format. For example, when the frame format corresponds to the OTU4 format, and the first signal format is OTU2, the amount of stuffing can range from −1 to -5 bytes, although if another column of stuffing is added, the range of stuffing can be shifted to range from +/−2 bytes, wherein each byte of stuffing can correspond to +/−65 ppm of frequency difference. When the frame format corresponds to the OTU4 format, and the first signal format is OTU2e, the amount of stuffing can range from +/−2 bytes. In some implementations, the signal management component 110 can facilitate adjusting the stuffing to make the stuffing indication more robust.

In some implementations, the signal management component 110 and/or the multiplexer component 106 can employ a defined payload type that can facilitate identifying the frame as multiplexed and also can include information that can facilitate identifying the first signal format (e.g., OTU2, OTU2e, etc.) of the signals being multiplexed to facilitate demultiplexing and decoding of the multiplexed signal by the second network element 104. For instance, the signal management component 110 and/or the multiplexer component 106 can employ one defined payload type that can facilitate identifying the payload of the frame as multiplexed and also can include information that can facilitate identifying the first signal format as being, for example, OTU2, for the signals that were multiplexed; and/or can employ a different defined payload type that can facilitate identifying the payload of the frame as multiplexed and also can include information that can facilitate identifying the first signal format as being, for example, OTU2e, for the signals that were multiplexed. In response to receiving the multiplexed signal from the network component 102 (or another component), the second network component 104 (e.g., the signal management component 116 and/or demultiplexer component 112) can analyze the received frame and can identify that the frame includes a multiplexed signal and also can identify the type of first signal format based at least in part on information in or associated with the frame, wherein such information can indicate the defined payload type associated with the frame and can identify the second signal format (e.g., OTUy, such as OTU4 or OTU 5) based at least in part on the particular frame employed.

With further regard to FIG. 1, as part of the multiplexing and/or encoding process(es), the signal management component 110 can control operations of the network component 102 to facilitate adding (e.g. inserting) the overhead and the stuffing to a multiplexed signal, interleaving signals, etc. The signal management component 110 can control operations of the multiplexer component 106 to facilitate having the multiplexer component 106 interleave (e.g., using column interleaving) the plurality of signals with the stuffing and add the overhead (e.g., OTUy overhead) to the multiplexed signal, without having to generate and add new ECC (e.g., OTUy FEC-type ECC) for the multiplexed signal, since the original ECC associated with the plurality of signals was not decoded and terminated.

Based at least in part on the control instructions from the signal management component 110, the multiplexer component 106 can interleave the plurality of signals with stuffing and can add overhead (e.g., OTUy overhead) to the multiplexed signal, without generating and adding new ECC for the multiplexed signal. The signal management component 106 can facilitate adding an amount of overhead to the packet containing the multiplexed signal so that the packet appears to be in the format and/or conforms to the format (e.g., OTUy format) to which the signal is being multiplexed, even though the internal format of the packet can be somewhat different due to the signals that were multiplexed being in the first format (e.g., OTUx format).

For respective signals, the signal management component 106 also can facilitate adding or subtracting a certain number of bytes, which can be the stuffing (e.g., stuffing adjustment), in a certain timeslot of a frame, based at least in part on the first signal format and the second signal format. The stuffing can be employed by the network component 102 during the multiplexing process due to taking the plurality (e.g., 10) asynchronous signals and combining those signals to a single frequency. The process of stuffing can involve adding or subtracting a certain number of bytes (e.g., stuffing bytes) in a certain timeslot of the frame to facilitate adjusting the rate of that timeslot to match or at least substantially match the incoming signal rate associated with the signal mapped to that timeslot. For example, when a plurality (e.g., 10) of OTU2 signals are being multiplexed to OTU4, there can be 10 timeslots in the OTU4 container (e.g., packet or frame), and for every input signal (e.g., OTU2 signal), the signal management component 106 can facilitate adding or removing a certain number of bytes (e.g., stuffing bytes) to facilitate adjusting the capacity of that timeslot to match the input signal.

The network component 102 can provide the multiplexed signal, with the stuffing (e.g., stuffing adjustment), overhead, and original ECC as an output for transmission to another component, which can be the second network component 104 or another network component that can facilitate transmitting the multiplexed signal, with the stuffing, overhead, and original ECC to the second network component 104.

The second network component 104 can receive the multiplexed signal as part of a frame (e.g., frame on an OTUy signal) in accordance with the second signal format (e.g., OTUy format). The second network component 104 can comprise a demultiplexer component 112 that can demultiplex the multiplexed signal using the original ECC (e.g., OTUx FEC-type ECC) associated with the plurality of signals, wherein the demultiplexer component 112 can include, for example, a decoder component 114 that can facilitate decoding or demultiplexing the plurality of signals.

The second network component 104 also can include a signal management component 116 that can be associated with (e.g., communicatively connected to) the demultiplexer component 112 and can control operations associated with the second network component 104, including operations associated with the demultiplexer component 112, to facilitate processing signals received by or transmitted from the second network component 104. For example, the signal management component 116 can control operations of the demultiplexer component 112 to facilitate demultiplexing and/or decoding the multiplexed signal, which can be in the second signal format (e.g., an OTUy format), using the original ECC (e.g., ECC associated with the OTUx format) to produce a plurality of demultiplexed signals in accordance with the first signal format (e.g., OTUx format).

The signal management component 116 and/or demultiplexer component 112 can identify or determine where the signals (e.g., treated as CBR signals) of the multiplexed signal are located within the frame based at least in part on the framing of the multiplexed signal (e.g., based at least in part on knowing the structure of the frame associated with the OTUy format). The signal management component 116 also can control operations of the second network component 104 to facilitate removing or filtering out overhead and stuffing from the multiplexed signal, deinterleaving signals, etc.

For instance, the signal management component 116 can control operations of the second network component 104 and/or the demultiplexer component 112 to facilitate having the second network component 104 and/or demultiplexer component 112 deinterleave the plurality of signals produced from demultiplexing the multiplexed signal, and removing or filtering out the overhead (e.g., OTUy overhead) and stuffing from the multiplexed signal. In some implementations, the second network component 104 and/or demultiplexer component 112 can include a filter component (not shown in FIG. 1), such as, for example, a jitter-attenuating phase-locked-loop (JA-PLL) filter that can filter out or remove the stuffing from the demultiplexed signals. As a result of the demultiplexing and/or decoding process, the second network component 104 can generate or produce a plurality of demultiplexed signals as an output, in accordance with the first signal format (e.g., OTUx format). The second network component 104 can provide (e.g., transmit, present) the plurality of demultiplexed signals to a next network component or other component or device for use and/or further processing.

The disclosed subject matter, using the original ECC associated with the plurality of signals associated with the first signal format (e.g., OTUx format) and not terminating such original ECC and generating new ECC associated with the second signal format (e.g., OTUy format), can multiplex and process the plurality of signals with relatively lower latency than the latency associated with conventional multiplexing systems and methods (e.g., conventional multiplexing systems and methods that decode the FEC, multiplex the signals and then generate and add on new FEC-type ECC to the multiplexed signal). Also, the disclosed subject matter can reduce the gate count associated with multiplexing signals as compared to the gate count associated with multiplexing signals using conventional systems and methods. Further, the disclosed subject matter can mix 10G CBR (OTUx).

It is to be appreciated and understood that, for reasons of brevity and clarity, only two network components (e.g., network component 102 and network component 104) are depicted in FIG. 1, however, the disclosed subject matter is not so limited. In accordance with various aspects and embodiments, the disclosed subject matter can comprise virtually any desired number of network components, and other components and devices, that can be distributed throughout a communication network environment (e.g., comprising one or more OTNs) and communicatively interconnected with one another in a desired configuration(s). It also is to be appreciated and understood that, while, for reasons of brevity and clarity, the network component 102 is depicted with the multiplexer component 106 and encoder component 108, and the second network component 104 is depicted with the demultiplexer component 112 and decoder component 114, the disclosed subject matter is not so limited. In accordance with various aspects and embodiments, the network component 102 also can include a demultiplexer component and a decoder component, and the second network component 104 can include a multiplexer component and an encoder component.

Figure 3:
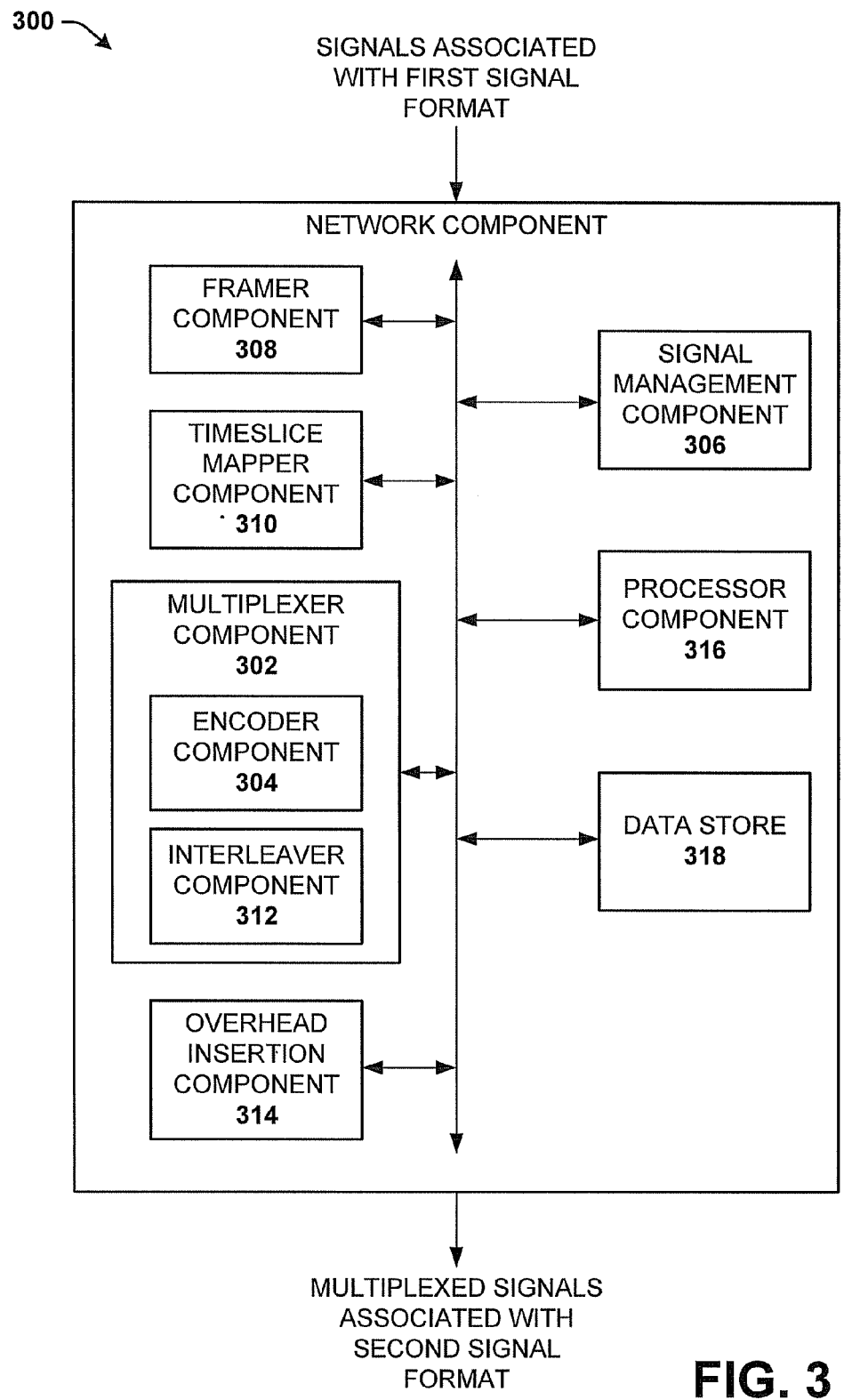
FIG. 3 illustrates a block diagram of an example, non-limiting network component that can facilitate multiplexing a plurality of signals in accordance with various aspects and embodiments of the disclosed subject matter.

Turning to FIG. 3, illustrated is a block diagram of an example, non-limiting network component 300 that can facilitate multiplexing a plurality of signals in accordance with various aspects and embodiments of the disclosed subject matter. The network component 300 can receive a plurality of signals (e.g., ODUs) in accordance with a first format (e.g., an OTUx format, such as, for example, an OTU2 or OTU2e format). The plurality of signals (e.g., 10 signals) can be associated with ECC (e.g., FEC-type ECC, such as FEC, EFEC, GFEC, etc.) that can be used to facilitate decoding and/or demultiplexing the data associated with the plurality of signals at a desired destination (e.g., a second network component, which can be directly or indirectly associated with the network component 300).

The network component 300 can include a multiplexer component 302 that can multiplex the plurality of signals, wherein the multiplexer component 302 can include, for example, an encoder component 304 that can facilitate encoding or multiplexing the plurality of signals. The network component 300 also can include a signal management component 306 that can be associated with (e.g., communicatively connected to) the multiplexer component 302 and control operations associated with the network component 300, including operations associated with the multiplexer component 302, to facilitate processing signals received by or transmitted from the network component 300. For example, the signal management component 306 can control operations of the multiplexer component 302 to facilitate multiplexing and/or encoding the plurality of signals, which can be in the first signal format (e.g., an OTUx format), to produce a multiplexed signal in accordance with a second signal format (e.g., OTUy format, such as, for example, an OTU4 format or an OTU5 format), while maintaining the original ECC associated with the plurality of signals (e.g., ECC associated with the first format (e.g., ECC associated with the OTUx format)) and without decoding the plurality of signals and associated ECC.

The network component 300 also can comprise a framer component 308 that can receive the plurality of signals associated with the first signal format (e.g., OTUx format) and can identify the type of signal format that the first signal format is based at least in part on information (e.g., FA OH information) contained in the packets of the plurality of signals. Based at least in part on identifying the signals as being in the first signal format, the framer component 308 can process the plurality of signals in accordance with the first signal format.

The network component 300 also can include a timeslice mapper component 310 that can be associated with the framer component 308 and other components (e.g., signal management component 306, etc.) of the network component 300. The timeslice mapper component 310 can receive the plurality of signals, including the original ECC associated therewith, and/or other information relating to the plurality of signals from the framer component 308 and/or another component(s) (e.g., signal management component 306). The timeslice mapper component 310 can map each of the plurality of signals, including the original ECC associated with those signals, to respective timeslots that can correspond to the second signal format (e.g., OTUy format). For example, in an OTU2-to-OTU4 case, the timeslice mapper component 310 can map each of the 10 OTU2 signals to the 10 timeslots of the OTU4 frame. The timeslice mapper component 310 and/or the signal management component 306 also can facilitate identifying or determining an amount of stuffing bytes to add or subtract to/from a given timeslot, based at least in part on the first signal format, the second signal format, the number of stuffing columns, and/or other factors. The timeslice mapper component 310 and/or the signal management component 306 can facilitate adding or subtracting the identified amount of stuffing to or from the respective timeslots of the frame (e.g., frame based on the second signal format (e.g., the OTUy format)). The timeslice mapper component 310 can provide the plurality of mapped signals (e.g., the plurality of signals, as mapped to correspond to the second-signal-format frame) to the multiplexer component 302, which can be associated with (e.g., communicatively connected to) the timeslice mapper component 310.

The multiplexer component 302 can receive the plurality of mapped signals from the timeslice mapper component 310 (or another component of the network component 300) and can multiplex and/or encode (using the encoder component 304) these signals, including the original ECC associated with these signals, in accordance with the second signal format and frame based on the second signal format. The multiplexer component 302 also can comprise or be associated with an interleaver component 312 that can interleave the signals, for example, using column interleaving, with and/or taking into account the stuffing.

The network component 300 also can include an overhead insertion component 314 that can be associated with the multiplexer component 302 and other components (e.g., signal management component 306) of the network component 300. The multiplexer component 302 and/or another component can provide the multiplexed and interleaved signals to the overhead insertion component 314. The overhead insertion component 314 can insert or associate overhead information, which can be based on or in accordance with the second signal format, into or with the multiplexed signals (e.g., the frames of the multiplexed signals). The network component 300 can provide (e.g., transmit, present, etc.) the multiplexed signal, in accordance with the second signal format, as an output, for example, to another component (e.g., a second network component or another component) for desired processing by such other component.

The network component 300 also can comprise a processor component 316 that can work in conjunction with the other components (e.g., multiplexer component 302, encoder component 304, signal management component 306, etc.) to facilitate performing the various functions of the network component 300. The processor component 316 can employ one or more processors, microprocessors, or controllers that can process data, such as information relating to mapping, multiplexing, encoding, or interleaving signals, etc., and information relating to other operations of the network component 300, and/or other information, to facilitate operation of the network component 300, as more fully disclosed herein, and control data flow between the network component 300 and other components (e.g., other components of or associated with the network component 300).

The network component 300 also can include a data store 318 that can store data structures (e.g., user data, metadata), code structure(s) (e.g., modules, objects, hashes, classes, procedures) or instructions, information relating to mapping, multiplexing, encoding, or interleaving signals, information relating to other operations of the network component 300, and/or other information, etc., to facilitate controlling operations associated with the network component 300. In an aspect, the processor component 316 can be functionally coupled (e.g., through a memory bus) to the data store 318 in order to store and retrieve information desired to operate and/or confer functionality, at least in part, to the multiplexer component 302, encoder component 304, signal management component 306, etc., and/or substantially any other operational aspects of the network component 300.

Figure 4:
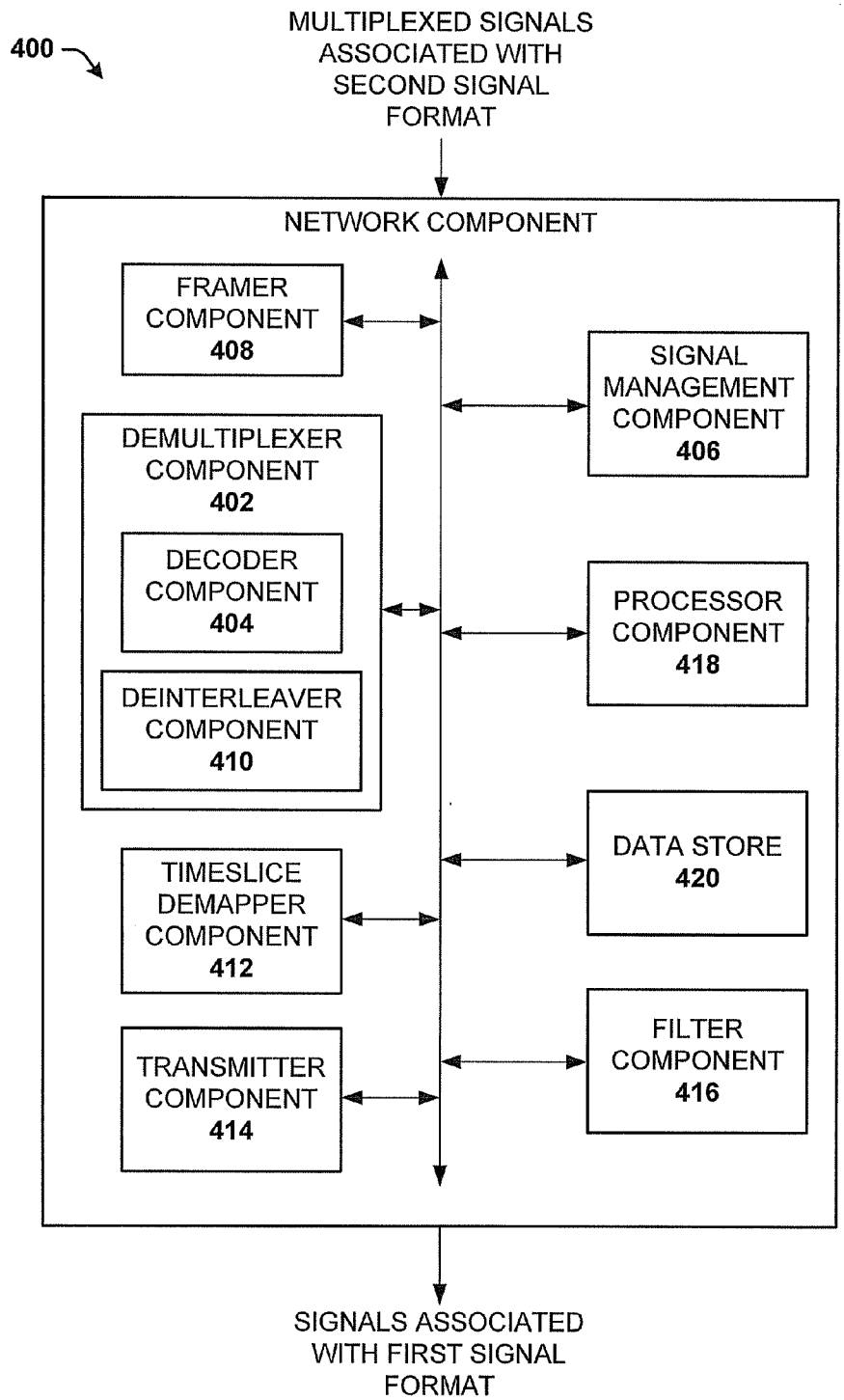
FIG. 4 presents a block diagram of an example, non-limiting network component that can facilitate demultiplexing multiplexed signals in accordance with various aspects and embodiments of the disclosed subject matter.

Referring to FIG. 4, presented is a block diagram of an example, non-limiting network component 400 that can facilitate demultiplexing multiplexed signals in accordance with various aspects and embodiments of the disclosed subject matter. The network component 400 (e.g., second network component) can receive multiplexed signals, in accordance with a second signal format (e.g., OTUy format), from another network component (e.g., network component 102 or network component 300), or another component or device, and can demultiplex the multiplexed signals to generate a demultiplexed set (e.g., 10) of signals, in accordance with a first signal format (e.g., OTUx format), which can be the signal format of the original set (e.g., plurality) of signals that were originally multiplexed.

The network component 400 can comprise a demultiplexer component 402 that can demultiplex the multiplexed signals using the original ECC (e.g., OTUx FEC-type ECC) associated with the plurality of signals, wherein the demultiplexer component 402 can include, for example, a decoder component 404 that can facilitate decoding or demultiplexing the multiplexed signals. The network component 400 also can include a signal management component 406 that can be associated with (e.g., communicatively connected to) the demultiplexer component 402 and can control operations associated with the network component 400, including operations associated with the demultiplexer component 402, to facilitate processing signals received by or transmitted from the network component 400. For example, the signal management component 406 can control operations of the demultiplexer component 402 to facilitate demultiplexing and/or decoding the multiplexed signals, which can be in the second signal format (e.g., an OTUy format), using the original ECC (e.g., ECC associated with the OTUx format) to produce a plurality of demultiplexed signals in accordance with the first signal format (e.g., OTUx format).

The network component 400 also can include a framer component 408 that can receive the multiplexed signals, which can be based on the second signal format, and can identify the multiplexed signals as being in accordance with (e.g., being structured in accordance with) the second signal format based at least in part on information (e.g., FA OH information) contained in the packets of the multiplexed signals. Based at least in part on identifying the multiplexed signals as being in the second signal format, the framer component 408 can process the multiplexed signals in accordance with the second signal format. The network component 400 can process or treat the multiplexed signals in a same or similar manner as CBR signals, wherein the framer component 408, demultiplexer component 402, and/or signal management component 406 can identify or determine where the signals of the multiplexed signal are located within a frame based at least in part on the framing of the multiplexed signal (e.g., based at least in part on knowing the structure of the frame associated with the OTUy format).

The framer component 408 can be associated with the demultiplexer component 402, and the framer component 408, either directly or indirectly, can provide (e.g., transmit) the multiplexed signals to the demultiplexer component 402 for demultiplexing, decoding, and/or other processing. The demultiplexer component 402 can comprise or be associated with a deinterleaver component 410 that can deinterleave (e.g., via column deinterleaving) the multiplexed signals of each frame in a manner that can correspond to how the signals were interleaved by the interleaver component of the network component that multiplexed and interleaved the signals. The demultiplexer component 402 also can demultiplex and/or decode (e.g., using the decoder component 404) the multiplexed signals to generate the demultiplexed signals, wherein the demultiplexer component 402 and/or decoder component 404 can use the original ECC (e.g., associated with the original plurality of signals associated with the first signal format) to facilitate decoding and/or error correcting the signals. The signal management component 406 can control operations of the demultiplexer component 402, decoder component 404, and/or deinterleaver component 410 to facilitate the performing of the respective operations of those components.

The network component 400 also can comprise a timeslice demapper component 412 that can be associated (e.g., directly or indirectly) with the demultiplexer component 402, signal management component 406, and/or another component(s) (e.g., a transmitter component 414, a filter component 416, etc.) of the network component 400. The demultiplexer component 402 and/or another component (e.g., signal management component 406 or other component) can provide the demultiplexed signals to the timeslice demapper component 412. The timeslice demapper component 412 can demap the demultiplexed signals based at least in part on the overhead information (e.g., overhead bytes or columns) associated with the second signal format (e.g., OTUy format), wherein the overhead information had been added during the multiplexing process, and the signals (e.g., 10 signals) of the frame had been mapped to correspond with the timeslots (e.g., 10 timeslots) associated with the second signal format and were being multiplexed to correspond with the second signal format. For example, when the plurality of signals (e.g., OTU2 or OTU2e signals) of a first signal format (e.g., OTU2 or OTU2e format) were originally multiplexed by another network component based on a second signal format (e.g., OTU4 format) and frame, the timeslice demapper component 412 can demap the signals based on the second signal format using the second-signal-format overhead information (e.g., OTU4 overhead information) associated with the signals in the frame.

The network component 400 further can include the transmitter component 414 and the filter component 416 that can be associated (e.g., directly or indirectly) with the timeslice demapper component 412, signal management component 406, and/or another component(s) of the network component 400. The timeslice demapper component 412 and/or another component (e.g., signal management component 406) can provide the plurality of demapped, demultiplexed signals to the transmitter component 414 and the filter component 416. For instance, the timeslice demapper component 412 and/or another component can provide the data payload of the plurality of demapped, demultiplexed signals to the transmitter component 414 and can provide the stuffing or stuffing-related information (e.g., information relating to the stuffing performed during the multiplexing process) associated with those signals to the filter component 416.

The filter component 416 can filter (e.g., filter out), remove, and/or compensate for (e.g., account for) the stuffing (e.g., stuffing adjustments made during the multiplexing process) associated with the plurality of demapped, demultiplexed signals from these signals based at least in part on the stuffing-related information associated with the signals. The information provided to the filter component 416 also can be or can include clocking information that can facilitate providing a desired clock for the transmitter component 414. The filter component 416 can facilitate generating the transmitter clock for the transmitter component 414. In some instances, due to the stuffing that can be associated with the signals, there can be gaps in the clocking signal that is to be used as the transmitter clock for the transmitter component 414. The filter component 416 can filter the clocking signal to facilitate compensating for clock signal gaps and/or jitter problems associated with the clocking signal and smoothing out the clock signal to generate a clock signal that can satisfy a defined jitter criterion(s) (e.g., generate a clock signal that can satisfy (e.g., can have an amount of jitter below) a defined maximum amount of acceptable jitter).

The plurality of processed (e.g., demapped, demultiplexed, etc.) signals can be in accordance with the first signal format (e.g., OTUx format), due in part to the original plurality of signals being in the first signal format and the multiplexing process and demultiplexing process, as disclosed herein. The transmitter component 414 can facilitate transmitting the plurality of processed (e.g., demapped, demultiplexed, etc.) signals in accordance with the first signal format (e.g., OTUx format) as an output based at least in part on the clocking signal received from the filter component 416. The signal management component 406 can control operations of the transmitter component 414 and filter component 416 to facilitate the performing of operations by the transmitter component 414 and filter component 416. The network component 400 can provide (e.g., transmit, present) the plurality of processed signals to a next network component or other component or device for use and/or further processing.

The network component 400 also can comprise a processor component 418 that can work in conjunction with the other components (e.g., demultiplexer component 402, decoder component 404, signal management component 406, etc.) to facilitate performing the various functions of the network component 400. The processor component 418 can employ one or more processors, microprocessors, or controllers that can process data, such as information relating to demultiplexing, decoding, deinterleaving, demapping, filtering, or transmitting signals, etc., information relating to other operations of the network component 400, and/or other information, to facilitate operation of the network component 400, as more fully disclosed herein, and control data flow between the network component 400 and other components (e.g., other components of or associated with the network component 400).

The network component 400 also can include a data store 420 that can store data structures (e.g., user data, metadata), code structure(s) (e.g., modules, objects, hashes, classes, procedures) or instructions, information relating to demultiplexing, decoding, deinterleaving, demapping, filtering, or transmitting signals, information relating to other operations of the network component 400, and/or other information, etc., to facilitate controlling operations associated with the network component 400. In an aspect, the processor component 418 can be functionally coupled (e.g., through a memory bus) to the data store 420 in order to store and retrieve information desired to operate and/or confer functionality, at least in part, to the demultiplexer component 402, decoder component 404, signal management component 406, etc., and/or substantially any other operational aspects of the network component 400.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 5:
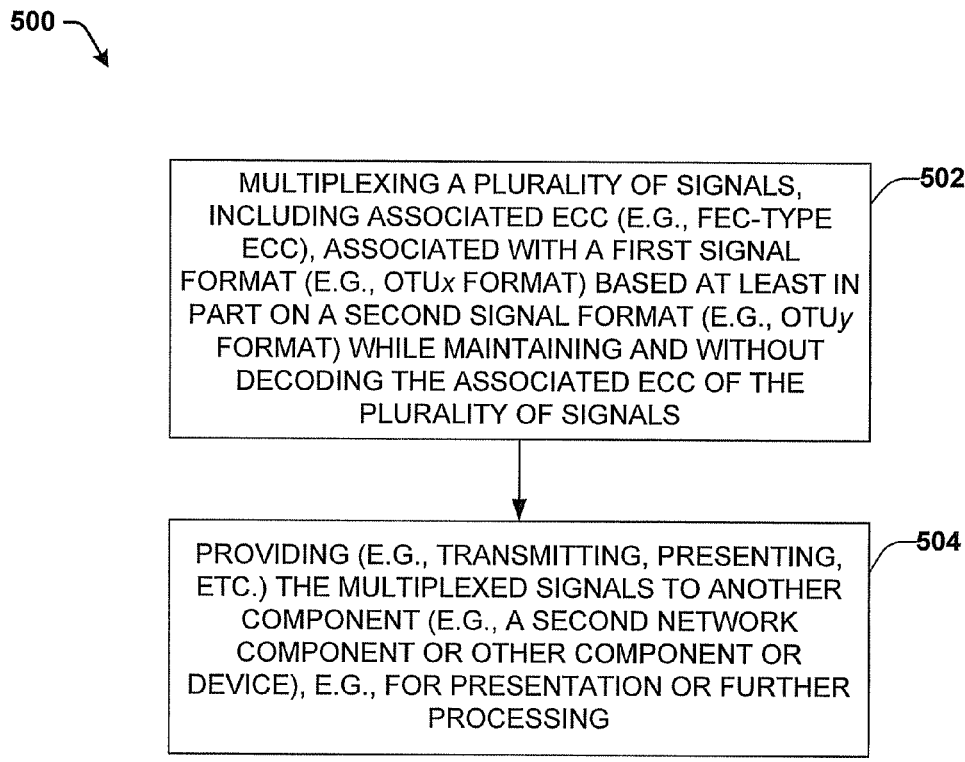
FIG. 5 illustrates a flow diagram of an example method for multiplexing signals of a first signal format in accordance with a second signal format, in accordance with various aspects and embodiments of the disclosed subject matter.
Figure 6:
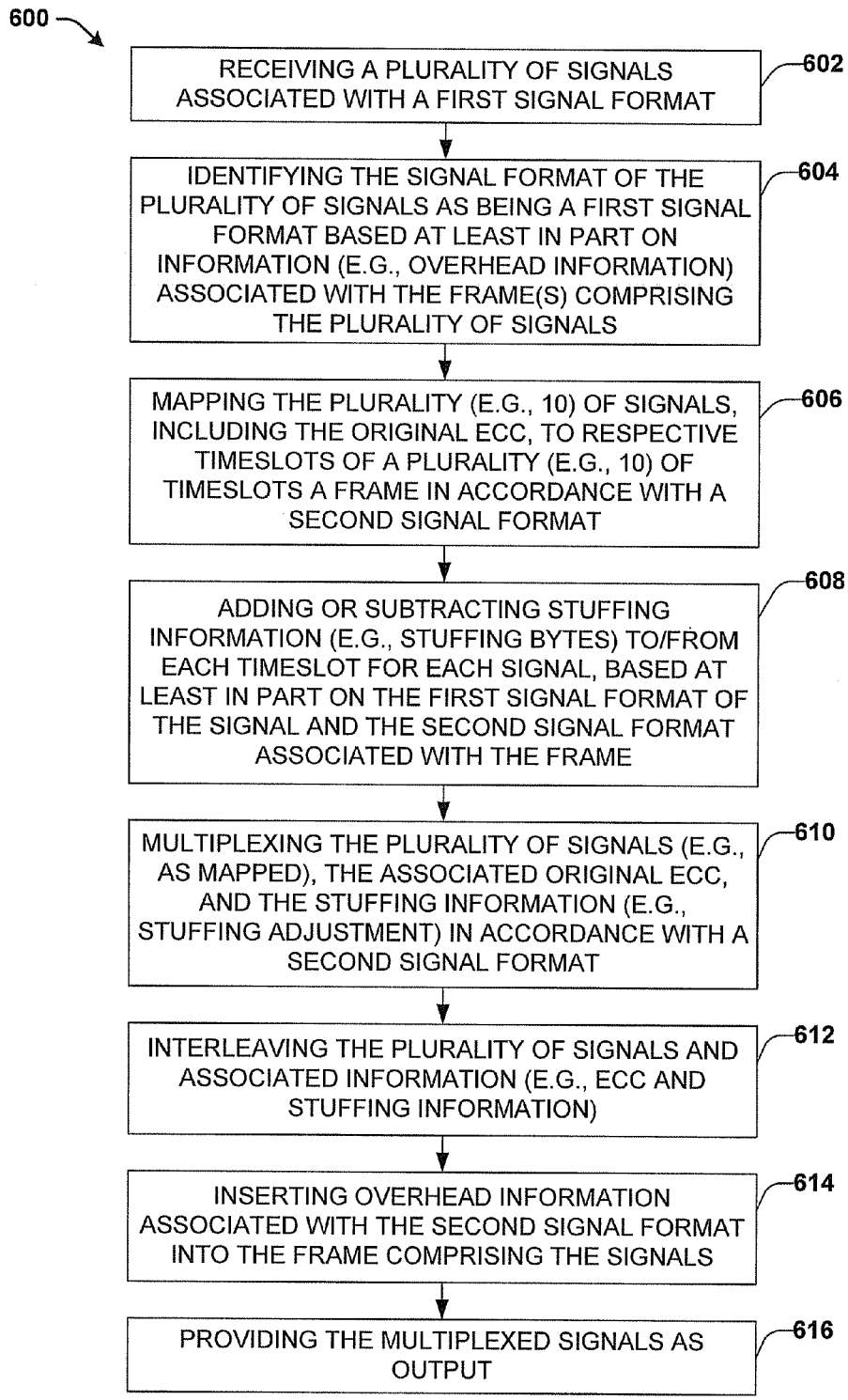
FIG. 6 depicts a flow diagram of another example method for multiplexing signals of a first signal format in accordance with a second signal format, in accordance with various aspects and embodiments of the disclosed subject matter.
Figure 7:
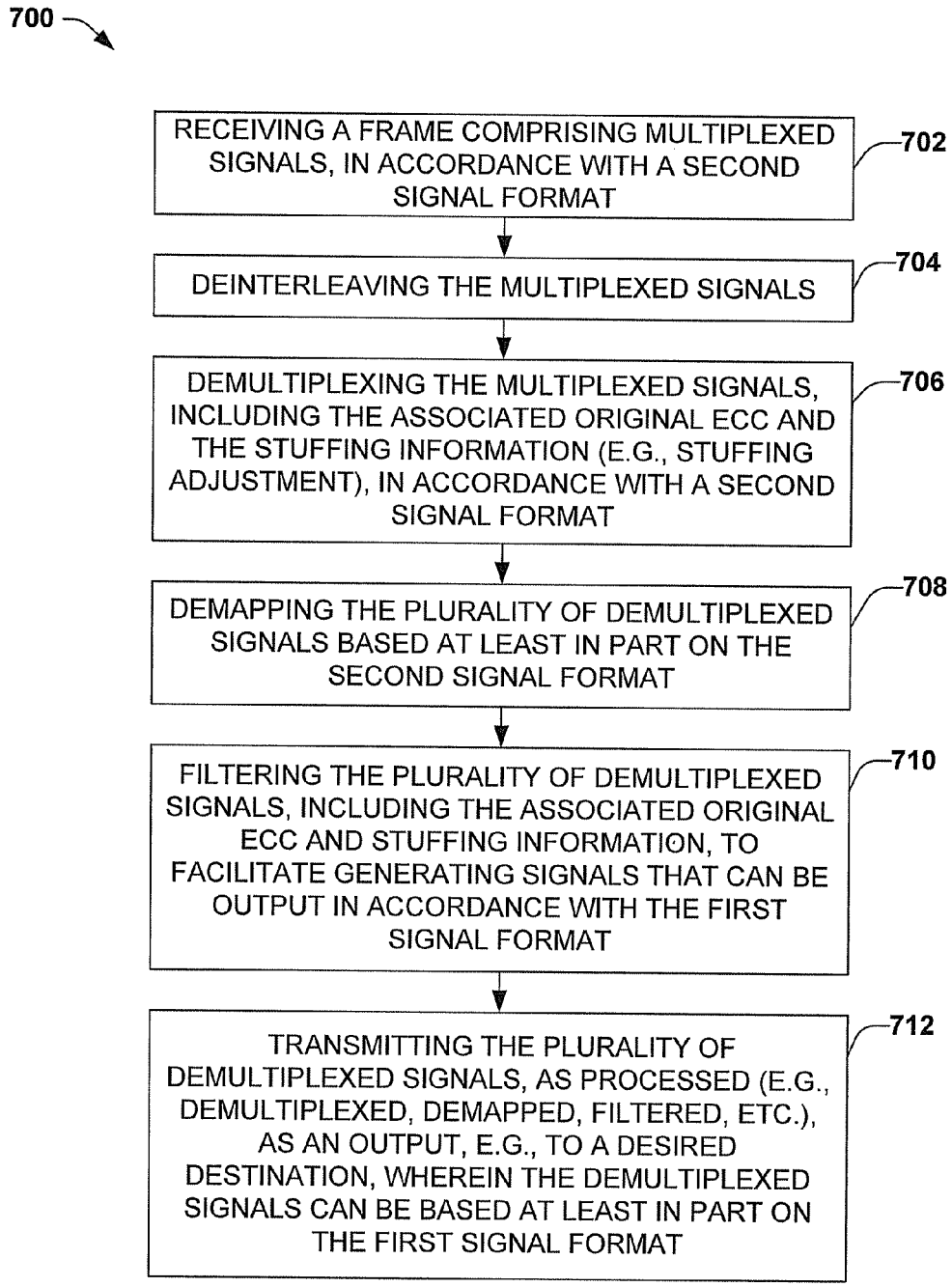
FIG. 7 a flow diagram of an example method for demultiplexing signals of a second signal format in accordance with a first signal format, in accordance with various aspects and embodiments of the disclosed subject matter.

In view of the example systems described above, methods that may be implemented in accordance with the described subject matter may be better appreciated with reference to the flow charts of FIGS. 5-7. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 5 illustrates a flow diagram of an example method 500 for multiplexing signals of a first signal format in accordance with a second signal format, in accordance with various aspects and embodiments of the disclosed subject matter. At 502, a plurality of signals, including associated ECC (e.g., FEC-type ECC), associated with a first signal format (e.g., OTUx format, such as, for example, an OTU2 format or OTU2e format) can be multiplexed based at least in part on a second signal format (e.g., OTUy format, such as, for example, an OTU4 format or OTU5 format) while maintaining and without decoding the associated ECC of the plurality of signals. A network component can receive the plurality of signals that can be formatted or structured based at least in part on the first signal format. The network component can include a multiplexer component, encoder component, and/or other components (e.g., signal management component, interleaver component, timeslice mapper component, etc.) that can facilitate mapping the signals based on the second signal format, multiplexing the signals, interleaving the signals, adding stuffing or performing stuffing adjustments in relation to the signals, and/or inserting overhead (e.g., based at least in part on the second signal format) into the frame associated with the signals, as more fully disclosed herein. The network component can multiplex the plurality of signals, including the associated ECC, associated with the first signal format in accordance with the second signal format without decoding the original ECC associated with the plurality of signals, terminating the original ECC associated with the plurality of signals, or having to generate new ECC to append to the multiplexed signals.

At 504, the multiplexed signals can be provided (e.g., transmitted, presented, etc.) to another component (e.g., a second network component or other component or device), for example, for presentation or further processing, as desired. The network component can provide the multiplexed signals, which can be multiplexed in accordance with the second signal format and can include the original ECC of the plurality of signals of the first signal format, to the other component for presentation or further processing.

Turning now to FIG. 6, depicted is a flow diagram of another example method 600 for multiplexing signals of a first signal format in accordance with a second signal format, in accordance with various aspects and embodiments of the disclosed subject matter. At 602, a plurality of signals associated with a first signal format can be received. A network component can receive the plurality of signals associated with the first signal format (e.g., OTUx format, such as, for example, OTU2 or OTU2e format). The plurality of signals can have ECC (e.g., FEC-type ECC) associated therewith.

At 604, the signal format of the plurality of signals can be identified as being a first signal format based at least in part on information (e.g., overhead information) associated with the frame(s) comprising the plurality of signals. The network component (e.g., a signal management component or framer component of the network component) can identify the type of signal format as being the first signal format based at least in part on information (e.g., FA OH information) contained in the packet(s) of the plurality of signals. Based at least in part on identifying the signals as being in the first signal format, the network component can initially process the plurality of signals in accordance with the first signal format.

At 606, the plurality (e.g., 10) of signals, including the original ECC, can be mapped to respective timeslots of a plurality (e.g., 10) of timeslots a frame in accordance with a second signal format (e.g., OTUy format, such as, for example, OTU4 or OTU5 format). The network component (e.g., using a timeslice mapper component) can map the plurality of signals to the respective timeslots of the frame based at least in part on (e.g., to correspond to) the second signal format. The network component can maintain the original ECC associated with the plurality of signals, and does not have to decode the original ECC or generate new ECC to append to the plurality of signals when multiplexed during the multiplexing process.

At 608, stuffing information (e.g., stuffing bytes) can be added to or subtracted from each timeslot for each signal, based at least in part on the first signal format of the signal and the second signal format associated with the frame, to facilitate adjusting the rate of that timeslot to match the incoming signal rate associated with the signal. The signal management component can facilitate adding or subtracting the stuffing information in relation to each signal and timeslot.

At 610, the plurality of signals (e.g., as mapped), the associated original ECC, and the stuffing information (e.g., stuffing adjustment) can be multiplexed in accordance with a second signal format. A multiplexer component can multiplex and/or encode the plurality of signals, the associated original ECC, and the stuffing information associated with the frame in accordance with the second signal format for the frame, which can be structured in accordance with the second signal format.

At 612, the plurality of signals and associated information (e.g., ECC and stuffing information) can be interleaved, for example, as part of the multiplexing process. An interleaver component associated with the multiplexer component can interleave the signals and associated information using a desired interleaving technique (e.g., column interleaving), for example, as part of the multiplexing process.

At 614, overhead information associated with the second signal format can be inserted into the frame comprising the signals. The network component (e.g., using an overhead insertion component) can insert or add the overhead information to the frame. The overhead information can comprise frame alignment overhead information (e.g., FA OH), transport overhead information (e.g., OTUk OH), data overhead information (e.g., ODUk OH), etc., that can be associated with or correspond with the second signal format.

At 616, the multiplexed signals can be provided (e.g., transmitted, presented) as output, for example, to a next network component or other component or device. The network component can provide the multiplexed signals, as processed (e.g., mapped, multiplexed, interleaved, and otherwise processed) by the method 600, as an output to another component or device (e.g., another network component (e.g., a second network component), a communication device, etc.) associated with the network component, for example, for further processing (e.g., demultiplexing, routing, etc.) and/or presentation (e.g., presentation of the data payload associated with the signals).

FIG. 7 illustrates a flow diagram of an example method 700 for demultiplexing signals of a second signal format in accordance with a first signal format, in accordance with various aspects and embodiments of the disclosed subject matter. For instance, when a plurality of signals, and associated original ECC, associated with a first signal format (e.g., OTUx format, such as OTU2 or OTU2e format) have been multiplexed in accordance with a second signal format (e.g., OTUy format, such as OTU4 or OTU5 format), a network component (e.g., a second network component) can employ the method 700 to demultiplex the multiplexed signals associated with second signal format to generate a plurality of demultiplexed signals associated with a first signal format.

At 702, a frame comprising multiplexed signals, in accordance with a second signal format, can be received. The network component can receive the multiplexed signals from another component or device (e.g., the network component that multiplexed the signals). The multiplexed signals can comprise the data payload and the original ECC associated with the data payload (e.g., the original ECC (e.g., associated with the first signal format) associated with the data payload), wherein the data payload and original ECC were multiplexed to generate the multiplexed signals in accordance with the second signal format.

At 704, the multiplexed signals can be deinterleaved. The network component (e.g., using a demultiplexer component and/or deinterleaver component) can deinterleave the multiplexed signals using a desired deinterleaving technique (e.g., column deinterleaving), for example, as part of the demultiplexing process. The deinterleaving technique employed can correspond to the interleaving technique (e.g., column interleaving) employed during the multiplexing process.

At 706, the multiplexed signals, including the associated original ECC and the stuffing information (e.g., stuffing adjustment), can be demultiplexed in accordance with a second signal format. The demultiplexer component can demultiplex and/or decode the multiplexed signals, including the associated original ECC and the stuffing information associated with the frame, in accordance with the second signal format. The structure of the frame can be in accordance with the second signal format, and the demultiplexer component can demultiplex the multiplexed signals contained in the frame to generate a plurality of demultiplexed signals.

At 708, the plurality of demultiplexed signals can be demapped based at least in part on the second signal format. The network component (e.g., using a timeslice demapper component) can demap the plurality of demultiplexed signals based at least in part on the second signal format. For instance, the timeslice demapper component can know the frame structure of the frame comprising the demultiplexed signals based at least in part on the second signal format and/or overhead information associated with the frame, wherein the frame structure (e.g., structure of the timeslots of the frame, etc.) can be based at least in part on the second signal format. The timeslice demapper component can demap the plurality of signals, wherein there can be a signal for each timeslot, and wherein there can be stuffing (e.g., a stuffing adjustment) associated with each signal.

At 710, the plurality of demultiplexed signals, including the associated original ECC and stuffing information, can be filtered to facilitate generating signals that can be output in accordance with the first signal format. The network component (e.g., using the filter component) can filter the plurality of demultiplexed signals to facilitate removing or compensating for the stuffing associated with the respective signals, and/or generating a desired (e.g., suitable) clocking signal for the transmitter component of the network component to facilitate transmitting the demultiplexed signals to a next destination (e.g., network component, communication device, etc.), as more fully disclosed herein. The demapping and filtering of the demultiplexed signals by the network component can facilitate generating demultiplexed signals that can be in accordance with the first signal format.

At 712, the plurality of demultiplexed signals, as processed (e.g., demultiplexed, demapped, filtered, etc.), can be transmitted as an output, for example, to a desired destination, wherein the demultiplexed signals can be based at least in part on the first signal format. The network component can transmit the plurality of demultiplexed signals as an output, wherein the network component can provide the demultiplexed signals to a next destination (e.g., network component, communication device, etc.).

Figure 8:
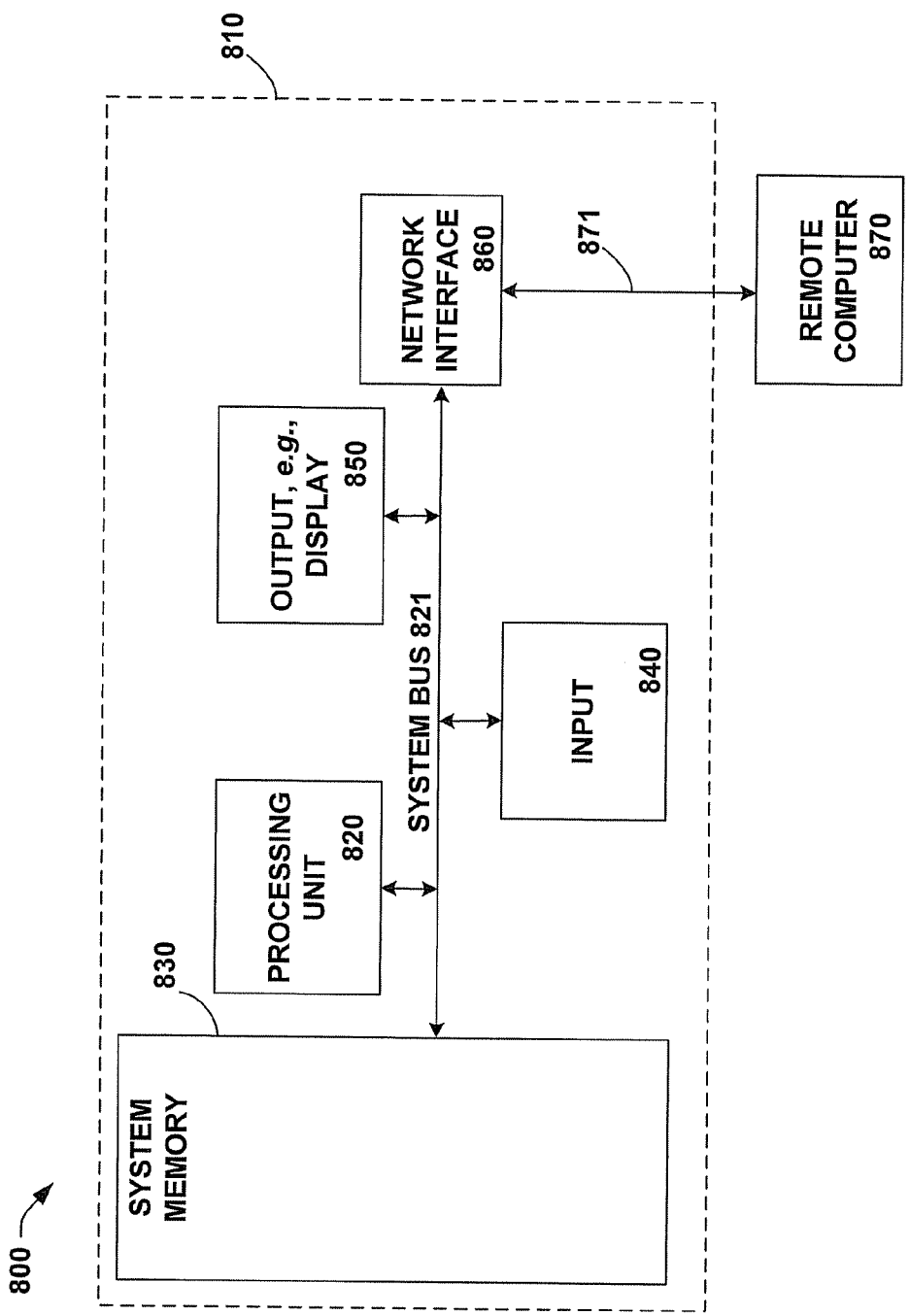
FIG. 8 illustrates a block diagram of an example electronic computing environment that can be implemented in conjunction with one or more aspects described herein.

As disclosed, advantageously, the techniques described herein can be applied to any device where it is desirable to facilitate multiplexing or demultiplexing signals. It is to be understood, therefore, that handheld, portable and other computing devices and computing objects of all kinds are contemplated for use in connection with the various non-limiting embodiments, e.g., anywhere that a device can be used to facilitate multiplexing or demultiplexing signals. Accordingly, the below general purpose computer described below in FIG. 8 is but one example, and the disclosed subject matter can be implemented with any client (e.g., computing or communication device) having network communication capabilities. Thus, the disclosed subject matter can be implemented in a communication network environment (e.g., comprising an OTN(s)), wherein the computer can comprise or be associated with a network component(s) (e.g., network element(s)) to facilitate multiplexing and/or demultiplexing signals, communicating signals, processing signals, etc., associated with the communication network environment.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 8 thus illustrates an example of a suitable computing system environment 800 in which some aspects of the disclosed subject matter can be implemented, although as made clear above, the computing system environment 800 is only one example of a suitable computing environment for a device and is not intended to suggest any limitation as to the scope of use or functionality of the disclosed subject matter. Neither should the computing system environment 800 be interpreted as having any dependency or requirement relating to any one or combination of components illustrated in the exemplary computing system environment 800 (e.g., operating environment).

With reference to FIG. 8, an exemplary device for implementing the disclosed subject matter includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computer 810 typically includes a variety of computer readable media. Computer readable media can be any available media that can be accessed by computer 810. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules, or other data in a modulated data signal such as a carrier wave or other transport mechanism and includes any information delivery media.

The system memory 830 may include computer storage media in the form of volatile and/or nonvolatile memory such as read only memory (ROM) and/or random access memory (RAM). A basic input/output system (BIOS), containing the basic routines that help to transfer information between elements within computer 810, such as during start-up, may be stored in memory 830. Memory 830 typically also contains data and/or program modules that are immediately accessible to and/or presently being operated on by processing unit 820. By way of example, and not limitation, memory 830 may also include an operating system, application programs, other program modules, and program data.

The computer 810 may also include other removable/non-removable, volatile/nonvolatile computer storage media. For example, computer 810 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 821 through a non-removable memory interface such as an interface, and a magnetic disk drive or optical disk drive is typically connected to the system bus 821 by a removable memory interface, such as an interface.

A user can enter commands and information into the computer 810 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 820 through user input 840 and associated interface(s) that are coupled to the system bus 821, but may be connected by other interface and bus structures, such as a parallel port, game port, or a universal serial bus (USB). A graphics subsystem can also be connected to the system bus 821. A projection unit in a projection display device, or a HUD in a viewing device or other type of display device can also be connected to the system bus 821 via an interface, such as output interface 850, which may in turn communicate with video memory. In addition to a monitor, computers can also include other peripheral output devices such as speakers which can be connected through output interface 850.

The computer 810 can operate in a networked or distributed environment using logical connections to one or more other remote computer(s), such as remote computer 870, which can in turn have media capabilities different from device 810. The remote computer 870 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 810. The logical connections depicted in FIG. 8 include a network 871, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 810 can be connected to the LAN 871 through a network interface or adapter. When used in a WAN networking environment, the computer 810 can typically include a communications component, such as a modem, or other means for establishing communications over the WAN, such as the Internet. A communications component, such as wireless communications component, a modem and so on, which can be internal or external, can be connected to the system bus 821 via the user input interface of input 840, or other appropriate mechanism. In a networked environment, program modules depicted relative to the computer 810, or portions thereof, can be stored in a remote memory storage device. It will be appreciated that the network connections shown and described are exemplary and other means of establishing a communications link between the computers can be used.

Figure 9:
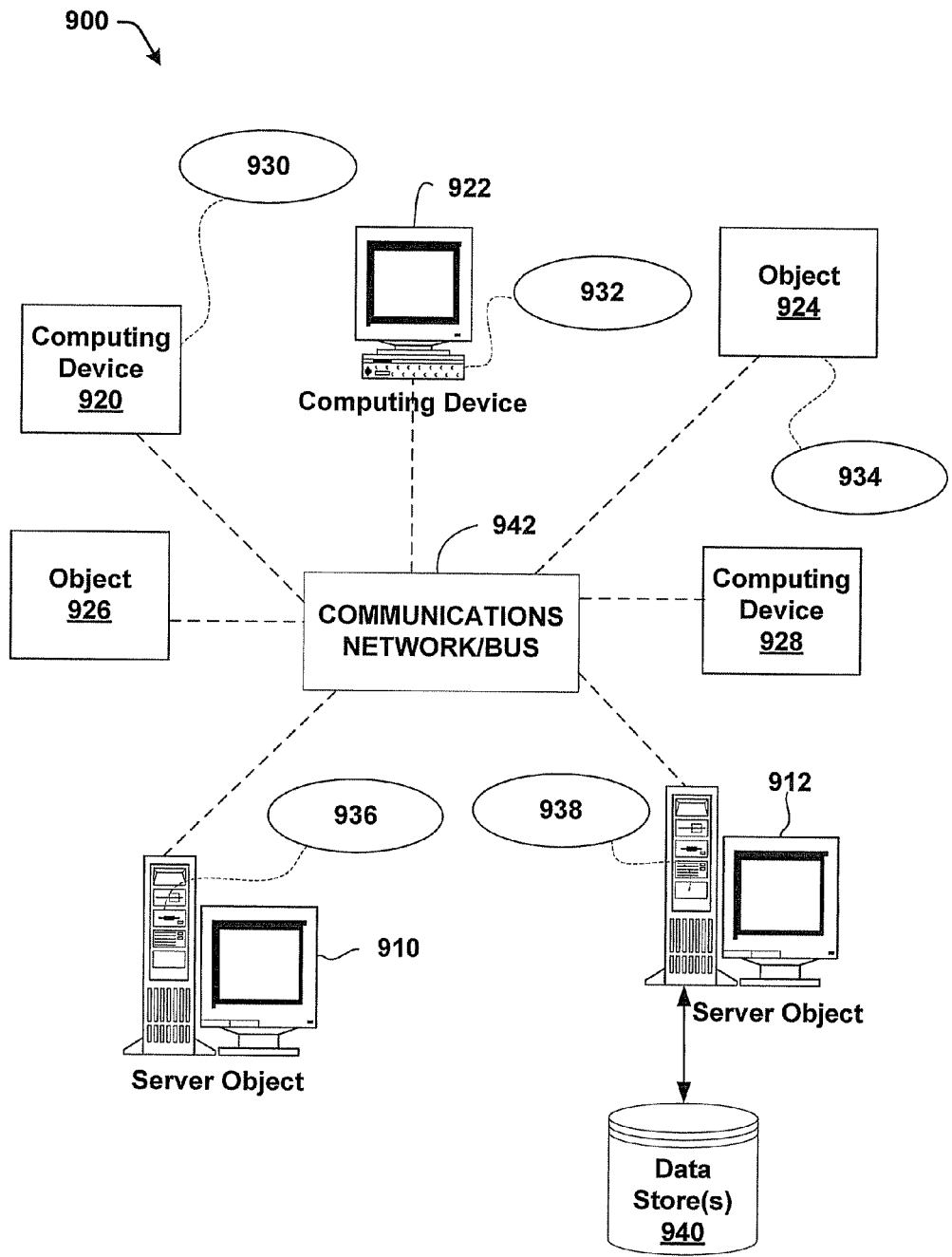
FIG. 9 illustrates a block diagram of an example data communication network that can be operable in conjunction with various aspects described herein.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938 and data store(s) 940. It can be appreciated that computing objects 910, 912, etc. and computing objects or devices 920, 922, 924, 926, 928, etc. may comprise different devices, including one or more network components (e.g., network elements) or similar devices depicted within the illustrations, or other devices such as a mobile phone, personal digital assistant (PDA), audio/video device, MP3 players, personal computer, laptop computer, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 942, either directly or indirectly. Even though illustrated as a single element in FIG. 9, communications network 942 may comprise other computing objects and computing devices that provide services to the system of FIG. 9, and/or may represent multiple interconnected networks, which are not shown. Each computing object 910, 912, etc. or computing object or devices 920, 922, 924, 926, 928, etc. can also contain an application, such as applications 930, 932, 934, 936, 938, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926,

928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 942 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
    a memory that stores instructions associated with components; and
    a processor that executes the instructions stored in the memory to facilitate performance of operations by the components, the components comprising:
        a network component that receives a plurality of signals and error correction code associated with the plurality of signals that are associated with at least one first signal format, and facilitates communication of information associated with the plurality of signals in a communication network; and
        a multiplexer component that multiplexes the plurality of signals and the error correction code associated with the plurality of signals to generate multiplexed signals in accordance with a second signal format, while maintaining and without decoding the plurality of signals and the error correction code, and without generating new error correction code to associate with the plurality of signals, prior to or during the multiplexing of the plurality of signals and the error correction code, wherein the multiplexed signals and the error correction code are stored in a same region of an optical transport unit associated with the second signal format, and the optical transport unit does not include a separate error correction code region, wherein the at least one first signal format is at least one of an optical transport unit 2 (OTU2) format or an optical transport unit 2e (OTU2e) format, and the second signal format is one of an optical transport unit 4 (OTU4) format or an optical transport unit 5 (OTU5) format, and wherein, during the multiplexing of the plurality of signals and the error correction code, the multiplexer component processes the plurality of signals as constant bit rate signals, without regard to content of the plurality of signals, to facilitate, during subsequent demultiplexing of the multiplexed signals, identifying where the plurality of signals are located in a frame associated with the second signal format based at least in part on knowledge of a structure of the frame and the processing of the plurality of signals as the constant bit rate signals.

2. The system of claim 1, further comprising a timeslice mapper component that maps respective signals of the plurality of signals to respective timeslots associated with the frame based at least in part on the second signal format.

3. The system of claim 2, further comprising a signal management component that facilitates identification of an amount of stuffing to apply to a timeslot of the respective timeslots of the frame to facilitate adjustment of a rate associated with the timeslot to at least substantially match a rate of a signal of the respective signals that is mapped to the timeslot, and application of the amount of stuffing to the timeslot, wherein the amount of stuffing is a positive or negative number of bytes.

4. The system of claim 3, further comprising an interleaver component that interleaves the multiplexed signals using column interleaving.

5. The system of claim 3, wherein the signal management component facilitates insertion of overhead information associated with the second signal format into the frame.

6. The system of claim 2, wherein the network component receives the plurality of signals in at least one frame associated with the at least one first signal format, and the multiplexer component multiplexes the plurality of signals to generate the multiplexed signals for the frame associated with the second signal format.

7. The system of claim 1, wherein the multiplexed signals are structured in the second signal format, and the multiplexed signals comprise the plurality of signals structured in the at least one first signal format and the error correction code structured in the at least one first signal format.

8. The system of claim 1, wherein the at least one first signal format comprises the OTU2 format and the OTU2e format, wherein first signals of the plurality of signals are in the OTU2 format and second signals of the plurality of signals are in the OTU2e format, and wherein the multiplexer component multiplexes the first signals, the second signals, and the error correction code together to generate the multiplexed signals in accordance with the second signal format.

9. A method, comprising:
receiving, by a system comprising a processor, a plurality of signals and error correction code that are associated with a first signal format;
multiplexing, by the system, the plurality of signals and the error correction code associated with the first signal format to generate multiplexed signals based at least in part on a second signal format, while maintaining and without decoding the error correction code, and without generating new error correction code to associate with the plurality of signals, wherein the multiplexed signals and the error correction code are stored in a same region of a frame associated with the second signal format, and the frame does not include a separate error correction code region, wherein the first signal format is a first type of optical-transport-unit format and the second signal format is a second type of optical-transport-unit format, and wherein, during the multiplexing of the plurality of signals and the error correction code, the plurality of signals are treated as constant bit rate signals, without regard to content of the plurality of signals, to facilitate, during demultiplexing of the multiplexed signals, identifying where the plurality of signals are located in the frame based at least in part on a structure of the frame and processing of the plurality of signals as the constant bit rate signals; and
providing, by the system, the multiplexed signals associated with the second signal format as an output.

10. The method of claim 9, further comprising mapping, by the system, respective signals of the plurality of signals to respective timeslots associated with a frame based at least in part on the second signal format.

11. The method of claim 10, further comprising:
determining, by the system, an amount of stuffing to apply to a timeslot of the respective timeslots of the frame associated with the second signal format to facilitate modifying a rate associated with the timeslot to at least substantially match a rate of the signal that is mapped to the timeslot; and
applying, by the system, the amount of stuffing to the timeslot, wherein the amount of stuffing is a positive or negative number of bytes.

12. The method of claim 11, further comprising:
interleaving, by the system, the multiplexed signals using column interleaving; and
adding, by the system, overhead information associated with the second signal format into the frame.

13. The method of claim 9, wherein the first type of optical-transport-unit format is at least one of an optical transport unit 2 (OTU2) format or an optical transport unit 2e (OTU2e) format, and the second type of optical-transport-unit format is one of an optical transport unit 4 (OTU4) format or an optical transport unit 5 (OTU5) format.

14. The method of claim 9, wherein the error correction code is based at least in part on a type of forward error correction.

15. A system, comprising:
a memory that stores instructions associated with components; and
a processor that executes the instructions stored in the memory to facilitate performance of operations by the components, the components comprising:
a network component that receives multiplexed signals and facilitates communication of information associated with the multiplexed signals in a communication network; and
a demultiplexer component that demultiplexes the multiplexed signals to generate a plurality of demultiplexed signals and associated error correction code in accordance with a first signal format, wherein the multiplexed signals are associated with a frame that corresponds to a second signal format, and during generation of the multiplexed signals by a multiplexer component, a plurality of signals and the error correction code, which are associated with the first signal format, and are received by the multiplexer component, are multiplexed to generate the multiplexed signals while maintaining and without decoding the error correction code, and without generating new error correction code to associate with the plurality of signals, prior to or during the multiplexing of the plurality of signals, wherein the multiplexed signals and the error correction code are stored in a same container of the frame associated with the second signal format, and the frame does not include a separate error correction code container, wherein the first signal format is at least one of an optical transport unit 2 (OTU2) format or an optical transport unit 2e (OTU2e) format, and the second signal format is one of an optical transport unit 4 (OTU4) format or an optical transport unit 5 (OTU5) format, and wherein, during the demultiplexing of the multiplexed signals, the demultiplexer component processes the multiplexed signals as constant bit rate signals, without regard to content of the multiplexed signals, to facilitate identifying where the plurality of signals are located in the frame that corresponds to the second signal format based at least in part on a structure of the frame.

16. The system of claim 15, further comprising:
a framer component that receives the multiplexed signals associated with the second signal format and identifies the multiplexed signals and the frame as being associated with the second signal format based at least in part on overhead information associated with the frame, wherein the overhead information is based at least in part on the second signal format; and
a signal management component that facilitates determination of respective locations of respective multiplexed signals of the multiplexed signals in the frame based at least in part on the identification of the multiplexed signals and the frame as being associated with the second signal format.

17. The system of claim 16, further comprising:
a deinterleaver component that deinterleaves the multiplexed signals using a deinterleaving technique that corresponds to an interleaving technique employed during the generation of the multiplexed signals; and
a timeslice demapper component that demaps the plurality of demultiplexed signals based at least in part on a portion of the overhead information.

18. The system of claim 15, further comprising:
a filter component that filters stuffing associated with the plurality of demultiplexed signals to facilitate removal of the stuffing, and facilitates generation of a clocking signal based at least in part on the filtering of the stuffing; and a transmitter component that transmits the plurality of demultiplexed signals as an output in accordance with the first signal format based at least in part on the clocking signal.

19. The system of claim 15, wherein the multiplexed signals are structured in the second signal format, and the multiplexed signals comprise the plurality of signals associated with the first signal format and the error correction code associated with the first signal format.

20. The system of claim 15, wherein the error correction code is based at least in part on a type of forward error correction.

\* \* \* \* \*